Figure 1:
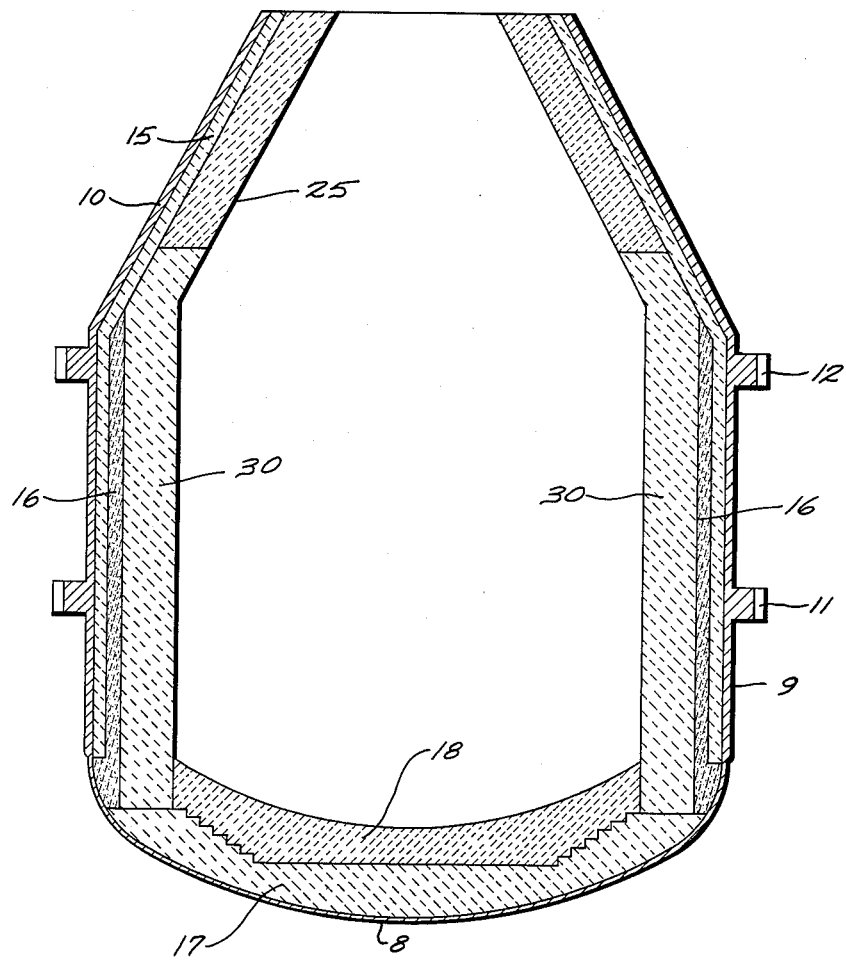

June 28, 1966   A. B. WILSON ETAL   3,258,257
METALLURGICAL FURNACE LININGS

Filed July 16, 1963   2 Sheets-Sheet 1

INVENTORS
ALBERT B. WILSON &
BY BEN DAVIES

ATTORNEY

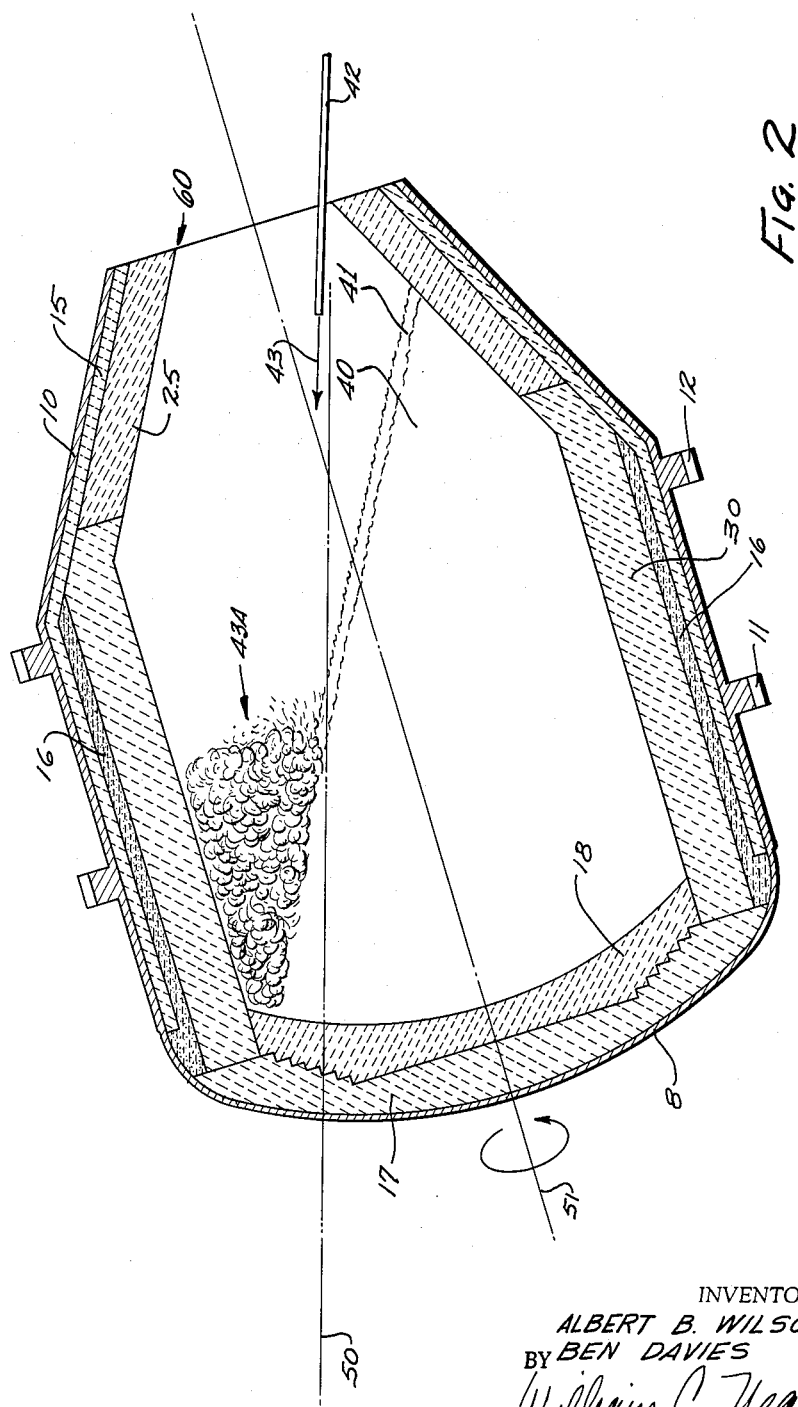

3,258,257
METALLURGICAL FURNACE LININGS
Albert Brent Wilson and Ben Davies, Pittsburgh, Pa., assignors to Harbison-Walker Refractories Company, Pittsburgh, Pa., a corporation of Pennsylvania
Filed July 16, 1963, Ser. No. 295,329
9 Claims. (Cl. 266—35)

This invention relates to furnace structure for the oxygen steelmaking process and, more particularly, to the fabrication of a lining for oxygen steelmaking furnaces of the type utilized in the Stora-Kaldo process. According to another aspect, it deals with the fabrication of an improved refractory lining for oxygen steelmaking process furnaces of the type in which substantial direct impingement occurs between the oxygen introduced and circumferential zones of the furnace lining, over practically an entire steelmaking or heat cycle.

The furnaces for all the presently practiced oxygen steelmaking processes fundamentally consist of an exterior metal shell having a refractory lining disposed therein. Most prior linings have been relatively simple, consisting of an "inner" or "working" lining of tar bonded, chemically bonded or burned (ceramically bonded) basic brick, an exterior or tank lining of burned magnesite brick and, usually, an intermediate lining of a tar bonded ramming mix of a composition similar to that of the working lining. No matter which type of brick has been used for the working lining, it has been conventional to provide that the interstitial pores of the brick are filled or impregnated with tar, and the faces of the brick coated, either by using the tar as a batch ingredient or by impregnating or dipping them.

During the evolution of the oxygen steelmaking processes, many different materials have been tried for working linings with varying degrees of success, in attempts to obtain longest possible service life, or at least a service life which is economical as calculated in cost of refractory per ton of steel produced. Because these oxygen steelmaking processes operate with basic slag, the art has uniformly seen the necessity of fabricating the working lining of basic materials, principally dead burned dolomite and dead burned magnesite or magnesia (we use the latter terms synonymously herein) with minor amounts of hard burned lime, in a variety of forms and combinations. When we refer to "dead burned" dolomite and magnesite herein, we mean the material is the product of a process which includes heating to an elevated temperature, normally above 3000° F., to produce oxides of relatively stable character, as compared to the raw or lightly calcined varieties of dolomite and magnesite.

Although many and varied types of lining materials have been tried in attempts to improve the service life of the working lining, the general practice appears to have at least temporarily settled on either making the whole working lining of one material or else to fabricate a so-called zoned lining. An exemplary zoned lining, which has shown considerable success in actual service, is that disclosed in copending application Serial No. 132,788, now Patent No. 3,148,238, of H. Carl Willenbrock, Jr., owned by the same assignee as the instant invention. However, even the Willenbrock-type lining has had some difficulty in the Stora-Kaldo furnace. Accordingly, it is an object of this invention to provide an improved working lining construction especially suited for use in a Stora-Kaldo type basic oxygen furnace. It is another object of the invention to provide an improved zoned lining for basic oxygen furnaces, of the type in which certain circumferential zones of the lining are subjected to direct flame, combustion product and oxygen impingement for extended periods of time during each heat conducted in such furnaces.

Briefly, according to one aspect of this invention, and it is upon this that the invention is primarily predicated, we have discovered that, contrary to the concepts and practices of the prior art, in certain types of oxygen converter furnaces, it is necessary to have an extensive circumferential portion of the barrel fabricated of a ceramically bonded basic brick free of certain impurities, and, also, free of the carbonaceous bonding materials or agents which conventionally have been used previously for fabrication of oxygen furnace working linings. The cone or open top section of the furnace has a lining of ceramically bonded basic brick, preferably tar impregnated, and the bottom may either be of the special carbon free, ceramically bonded brick used to fabricate the intermediate zone, or it may be of any of the other previously and presently available and used chemically bonded or ceramically bonded brick. They may be tar impregnated or tar bonded and of any of various dolomite and magnesite brick or shapes, viz.: The bottom of the lining may be composed of brick made of stabilized dolomite, dead burned dolomite, hard burned lime, dead burned natural magnesite, dead burned synthetic magnesite, and any of the foregoing, in various proportions.

Further detail and other objects and advantages of lining construction according to this invention will become readily apparent to those skilled in the art from a study of the following description with reference to the drawings. In these drawings:

FIG. 1 is a schematic side elevation of a Stora-Kaldo-type furnace in an upright position; and FIG. 2 is the furnace of FIG. 1, in its high speed rotational position at approximately 17° to the horizontal, schematically illustrating the considerable direct impingement of oxygen on portions of the working lining during a steelmaking heat.

The major basic oxygen processes, LD, Kaldo and Rotor all have one thing in common, viz.: Essentially pure oxygen is directed onto or into a bath of molten metal to burn out carbon, silicon, manganese, and other elements. The processes, most common in the United States, are of the top blowing variety, in which an oxygen lance, usually water cooled, is directed down through an open top to direct oxygen into turbulent contact with the upper surface of a slag covered molten bath. This is the LD type process. The Rotor-type basic oxygen process vessel is, in essence, an elongate rotatable drum, having relatively small openings centrally of each end. Oxygen is introduced to the furnace interior by a tube or lance which passes through one of the end openings. This lance is usually of generally Y-shape so oxygen can be directed both over and below the surface of a contained molten metal bath.

A Stora-Kaldo type furnace is comprised of an open topped drum, in many respects similar to that used in the LD-type top blowing processes. The Stora-Kaldo furnace is conventionally supplied with a parallel pair of large running rings mounted circumferentially about the exterior of the furnace. There are trunnion frames; and the combination of the rings, drive means therefore, and trunnion frames allows for variable speed rotation of the vessel, at varying angles to the horizontal. The Stora-Kaldo furnaces are, at present, somewhat smaller than either the Rotor or LD type, and are used for making high quality steel. They may, for example, have a capacity on the order of 150 net tons per heat, whereas LD-type furnaces now produce on the order of 250 to 350 net tons per heat. One installation, of which we know, has a furnace on the order of 18½ ft. outside diameter by about 26 ft. in length or height, and its running rings are on the order of 22 ft., outside diameter.

Oxygen is injected into the Stora-Kaldo furnace at a pressure upwards of 100 p.s.i.g. through water-cooled variable position lances or tubes. The oxygen is injected at a very low angle to the molten metal bath. For example, the furnace is tilted to on the order of 17° to the horizontal, and the lance introduces oxygen at an angle of about 26° to the bath, when the furnace is in such a position. Such low angle introduction of oxygen causes considerable turbulence and violent intermixing of the ingredients in the bath (desirable for the process) and, also, inherently results in considerable flame and oxygen impingement on the intermediate wall or drum section of the furnace.

Referring now to the drawings:

FIG. 1 shows a conventional Stora-Kaldo furnace with a lining positioned therein which is constructed according to the concepts of this invention. The furnace includes a metal rounded bottom shell 8, an intermediate cylindrical metal barrel shell 9, a truncated conical metal cone section shell 10, and a pair of spaced parallel running rings 11 and 12 mounted about the barrel section. The immediate inside surfaces of the cone and barrel are provided with a lining 15 of a conventional type usually consisting of burned magnesite brick, dolomite-magnesite brick, etc. Since this portion of the lining does not contact molten metal, its chemical nature is not critical. However, it is generally recommended that the brick be of the burned basic class. Also, they should be free of hydratable lime or the like since, in many respects, they form a "permanent" lining. Through the barrel portion 9, the lining 15 is covered with a tar bonded ramming mix 16. The composition of this monolithic portion of the lining is, also, not critical, but it is recommended that it be a tar bonded magnesite ramming mix. It is usually the same, or substantially the same, in chemical composition of refractory ingredients as the lining 15. The backup 17 of shell section 8 can be the same as shell lining 15.

The molten metal-contactig working lining bottom 18 is, preferably, tar bonded or tar impregnated basic refractory material selected from the group stabilized dolomite, dead burned dolomite, hard burned lime, dead burned natural magnesite, dead burned synthetic magnesite, and any of the foregoing in various proportions. Very satisfactory refractory shapes are, for example, those tar bonded ones disclosed and claimed in copending application Serial No. 266,796, King et al. owned by the same assignee as the instant invention.

The upper or cone section 10 preferably has for its working lining 25 ceramically bonded, tar impregnated high magnesia shapes. Very satisfactory material is that disclosed and claimed in copending application Serial No. 113,094, now United States Patent No. 3,106,475, patented October 8, 1963, Davies et al., also owned by the same assignee as the instant invention. These Davies et al. shapes are ceramically bonded magnesia shapes, having at least about 96% MgO, on the basis of an oxide analysis, are impregnated throughout with a tar bonding material, and are highly resistant to impact and abrasion.

The intermediate or drum portion of the lining 30 is a non-tar impregnated, high purity, ceramically bonded refractory such as, for example, the type disclosed and claimed in copending application Serial No. 254,013, now Patent No. 3,141,790, Davies et al. The refractory shapes of this latter invention consist of at least about 96% MgO, having no more than about 1% of $R_2O_3$ materials (i.e. $Fe_2O_3$, $Al_2O_3$ and $Cr_2O_3$), the remainder being CaO and $SiO_2$ in a weight ratio between 3 to 1 and about 4 to 1, and being petrographically characterized by extensive periclase to periclase crystal attachment, with the CaO and $SiO_2$ content largely present in spaced disconnected pockets between the periclase crystals, and characterized largely as tricalcium silicate. While this composition is preferred for forming the lining section 30, it is equally feasible to line this section with the 96% MgO content refractory shapes of Serial No. 113,094, without tar impregnation.

Still further, it is possible to form the lining 30 with the non-tar impregnated, ceramically bonded shaped disclosed and claimed in application Serial No. 266,796, which fired shapes are made from a batch consisting essentially of at least 96% MgO plus CaO, on the basis of an oxide analysis, and made from a blend of material selected from the group consisting of dead burned, high purity dolomite, dead burned, high purity magnesite, and lime, and in which the MgO content varies or ranges from about 95 to about 50%, and the CaO from about 5 to 50%. These shapes are uniquely characterized, in that the CaO content is not stabilized and is distributed through at least the fine fraction of the batch used to make the fired shapes.

The extent of the intermediate zone is such that, when the furnace is tilted to operational position, as is schematically shown in FIG. 2, that portion of the lining exposed to the turbulent molten metal and slag foaming and direct combustion product and flame impingement (generally area 43A) is of ceramically bonded carbon free material. A horizontal axis is schematically indicated by the line 50, and the axis about which the furnace rotates is schematically indicated by the 51. Line or axis 51 is at an angle of about 17°, relative to the horizontal 50.

We have shown, in a schematic manner, a molten metal bath 40 having a slag layer 41 thereover, and indicated an oxygen lance 42, with its discharge of high purity oxygen 43 at a low angle relative to the surface of the molten metal and slag. The oxygen lance may direct oxygen at an angle of about 26° relative to the surface of the bath of molten metal and slag.

The foregoing makes it clear the essence of this invention resides in use of a special intermediate zone for a working lining suitable for use in a Stora-Kaldo type furnace, which intermediate zone is, in essence, a circumferential band which can be of variable longitudinal extent, depending on the size of the furnace, the degree of turbulent foaming and the area of flame and combustion product impingement thereagainst. By rule of thumb, we would suggest as a minimum for this zone, on the order of about ⅓ the longitudinal extent of the barrel section, measuring from the bottom refractory layer 18. For a furnace on the order of 25 ft. in length or height, this zone can be 5 to 10 ft., but we prefer that it extend upwards to the beginning of the cone section which would, thus, make it more on the order of about 15 ft. in vertical extent. Also, while we state this portion of the lining must be carbon free for best results, we do not wish to exclude use of ceramically bonded brick which merely have been coated with tar or the like, which coating will rapidly burn out in service.

As mentioned above, the cone section is, preferably, fabricated of shapes of the type disclosed and claimed in copending application Serial No. 113,094. This is because the cone section is subject to conditions bringing about substantial abrasion and spalling. The physical punishment that this section takes in service is readily apparent when one considers the method of tapping a Stora-Kaldo-type furnace, i.e. lime is shoveled in on the slag to build a dam up about, or at least adjacent, the lip 60 of the open top, and then the furnace is tipped on its side, and molten metal is allowed to pass over the lip beneath the dam. The conditions, which are encountered with such practices, are destructive to most refractories. Also, while the intermediate zone is necessarily non-tar impregnated, i.e. carbon free because of the oxidizing conditions they encounter during service, it is preferable that the cone section be tar impregnated because of the reducing conditions encountered thereover. With a working lining for a Stora-Kaldo furnace, zoned in the manner disclosed, extended life and best economy appear to be experienced.

All reference to chemical composition is on the basis of an oxide analysis, in conformity with the conventional practices of reporting the chemical content of refractory materials. All parts and percentages are by weight.

Having thus described the invention in detail and with sufficient particularity as to enable those skilled in the art to practice it, what is desired to have protected by letters patent is set forth in the following claims:

We claim:

1. An oxygen converter furnace comprising a metal drum which is open at its top, an internal drum protective refractory lining in contact with substantially all inner surfaces of said drum, means interconnected with the drum arranged to drive it at variable speeds and to tilt it at varying angles to the horizontal during oxygen blowing, an outer molten metal and slag contacting working lining contiguously overlying said protective lining, said working lining consisting of at least three contiguous zones including a bottom zone, an intermediate barrel zone and an upper cone zone, the cone zone extending downwardly from the open top of the drum to a point intermediate the vertical extent of said drum, the barrel zone extending downwardly from a position immediately adjacent the lower extent of the cone zone to a lower position above the bottom zone, the bottom zone contiguously overlying the remainder of the protective lining, the entire working lining being substantially entirely fabricated of basic refractory material selected from the group dead burned magnesite, dead burned dolomite, and hard burned lime, at least said barrel zone being fabricated of ceramically bonded refractory through a circumferential band thereof which is subjected to direct flame and combustion product impingement and molten metal and slag foam for extended periods of time during each heat conducted in the furnace.

2. The lining of claim 1 in which the cone section is fabricated of a tar impregnated ceramically bonded refractory consisting of at least about 96% of MgO.

3. The lining of claim 1 in which the bottom zone is fabricated of tar bonded refractory.

4. The lining of claim 1 in which the ceramically bonded refractory forming said circumferential band extends on the order of ⅓ of the longitudinal extent of the barrel zone, measuring from the bottom zone.

5. The lining of claim 4 in which said circumferential band is, on the basis of an oxide analysis, at least about 96% MgO, there being materials of the group $Al_2O_3$, $Fe_2O_3$, and $Cr_2O_3$, in an amount up to about 1%, the remainder being CaO and $SiO_2$ in a weight ratio between 3 to 1 and 4 to 1, and being petrographically characterized by periclase to periclase crystal attachment with the CaO and $SiO_2$ content largely present in spaced disconnected pockets between the periclase crystals and characterized largely as tricalcium silicate.

6. An oxygen converter furnace of the Stora-Kaldo type comprising an open topped drum having a pair of externally mounted circumferential running rings, an internal refractory lining covering the inside surfaces of the drum, said drum including means arranged to drive the running rings at variable speeds and to tilt it at varying angles to the horizontal during oxygen blowing, said lining including at least an inner shell lining contiguous to the inner surfaces of the drum and an outer molten metal and slag contacting working lining overlying the shell lining, said working lining consisting of at least three zones including a bottom zone, an intermediate barrel zone and an upper cone zone, the cone zone extending downwardly from the open top of the vessel to contact the upper extent of the barrel zone at a point intermediate the vertical extent of the drum, and the barrel zone extending from contact with the cone zone to contact with the bottom zone at a point above the bottom of the drum, the bottom zone covering the remainder of the shell lining, the entire working lining being substantially entirely fabricated of basic refractory material selected from the group dead burned magnesite, dead burned dolomite, and hard burned lime, the total MgO plus CaO content of the materials used for the working lining being at least about 96%, by weight, and there being up to about 4%, by weight, of $SiO_2$, $Al_2O_3$ and $Fe_2O_3$ in the material, at least said barrel zone being fabricated of ceramically bonded refractory through a circumferential band thereof which is subjected to direct flame and combustion product impingement and molten metal and slag foam for extended periods of time during each heat conducted in the furnace.

7. An oxygen converter furnace comprising an open topped drum, said drum having an internal refractory lining and in which said drum includes means arranged to drive it at variable speeds and to tilt it at varying angles to the horizontal during oxygen blowing, said lining comprised of an inner shell lining in contiguous contact with substantially all internal drum surfaces and an outer molten metal and slag contacting working lining overlying substantially the entire shell lining, said working lining consisting of at least immediately contiguous three immediately contiguous zones including a bottom zone covering the bottom of the shell lining and a portion of the sides thereof to a point intermediate the ends of the drum, an immediately barrel zone and an upper cone zone, the cone zone extending downwardly from the open top of the vessel to contact the barrel zone at a point intermediate the vertical extent of the drum, and the barrel, and the barrel zone extending therefrom to the bottom zone, the entire working lining being substantially entirely fabricated of basic refractory material selected from the group dead burned magnesite, dead burned dolomite, and hard burned lime, the total MgO plus CaO content of the materials used for the working lining being at least about 96%, by weight, and there being up to about 4%, by weight, of $SiO_2$, $Al_2O_3$ and $Fe_2O_3$ in the material, at least said barrel zone being fabricated of ceramically bonded refractory through a circumferential band thereof which is subjected to direct flame and combustion product impingement and molten metal and slag foam for extended periods of time during each heat conducted in the furnace.

8. An oxygen converter furnace comprising an open topped furnace vessel having an internal refractory lining over all exposed internal surfaces thereof, said furnace and lining being symmetrical about a common axis, means arranged to drive the furnace at variable speeds at an attitude substantially parallel to a supporting surface during oxygen blowing, means arranged to blow oxygen so as to impinge on the surface of a molten metal bath in the vessel, said lining including at least an inner shell lining in contiguous contact with internal surfaces of the vessel and an outer molten metal and slag contacting working lining in contiguous overlying relation to the shell lining, said working lining having an intermediate barrel zone which extends at least a major portion of the total length of the vessel intermediate the ends of said vessel, the entire working lining, including the barrel zone, being substantially entirely fabricated of basic refractory material selected from the group dead burned magnesite, dead burned dolomite and hard burned lime, the refractory in said barrel zone being ceramically bonded and essentially free of carbonaceous material through a circumferential band thereof which is subjected to direct flame and combustion product impingement and molten metal and slag foam for extended periods of time during each heat conducted in the furnace.

9. The oxygen converter furnace of claim 8 in which the basic refractory material of the entire working lining has a total $MgO+CaO$ content of at least about 96%, by weight, the remainder being up to about 4%, by weight, of $SiO_2$, $Al_2O_3$, and $Fe_2O_3$.

References Cited by the Examiner

UNITED STATES PATENTS

| | | | |
|---|---|---|---|
| 2,930,688 | 3/1960 | Kalling et al. | 266—36 X |
| 3,058,834 | 10/1962 | Koehegyi | 106—59 |
| 3,060,042 | 10/1962 | Leatham et al. | 106—58 |
| 3,070,449 | 12/1962 | Davies et al. | 106—58 X |
| 3,074,806 | 1/1963 | Atlas et al. | 106—58 |

OTHER REFERENCES

Holt, J.: "Tar Bonds Oxygen Vessel Bricks," in steel: vol. 143, pp. 74–78, July 7, 1958.

JOHN F. CAMPBELL, *Primary Examiner.*

JAMES H. TAYMAN, JR., *Examiner.*

J. J. MULLEN, J. M. ROMANCHIK,
                              *Assistant Examiners.*